Patented May 8, 1951

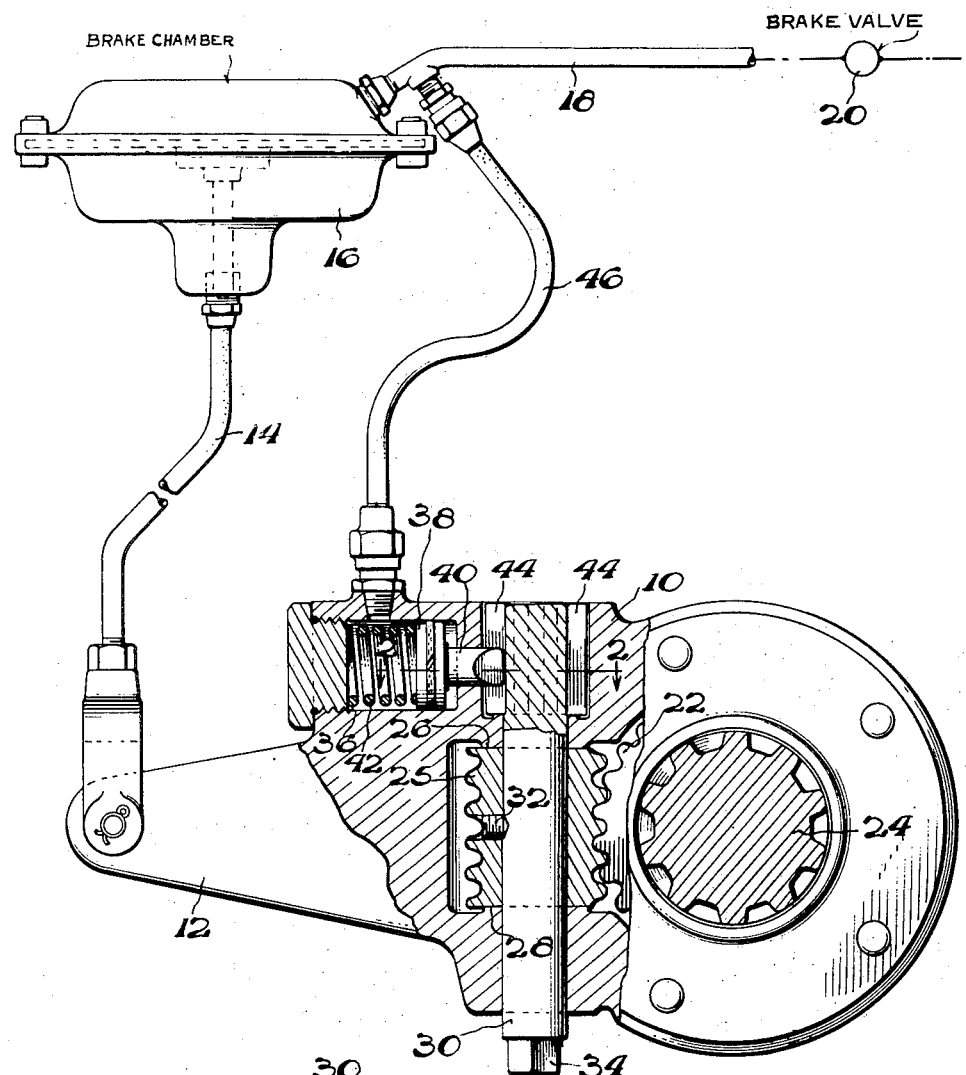
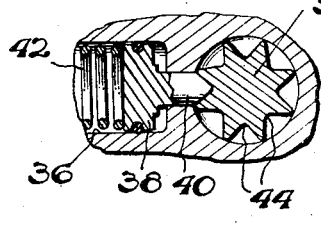

2,551,888

UNITED STATES PATENT OFFICE 2,551,888

BRAKE SLACK ADJUSTER

Claude E. Learn, Elyria, Ohio, assignor to Bendix-Westinghouse Automotive Air Brake Company, Elyria, Ohio, a corporation of Delaware Application September 18, 1947, Serial No. 774,809

2 Claims. (Cl. 188—79.5)

This invention relates to slack adjusters for vehicle brakes and more particularly to a slack adjuster for fluid pressure operated vehicle brakes which is positively locked in a desired position of adjustment during energization of the brakes.

One of the objects of the present invention is to provide a slack adjuster construction for fluid pressure operated vehicle brakes, which embodies a worm wheel and a worm for adjusting purposes, together with a novel arrangement for insuring that the adjusted position of the parts will not change during application of the brakes.

Another object is to provide a novel adjusting and locking mechanism for a brake slack adjuster wherein the parts may be readily adjusted to provide proper brake shoe clearance, and may be securely locked in adjusted position during brake application.

A further object includes the provision of a fluid pressure operated lock for a brake slack adjuster which is so arranged that application of the brakes will render the lock operative to prevent any change in the adjustment of the slack adjuster.

Still another object is to provide in a slack adjuster and locking mechanism of the above type, a novel and simplified arrangement of parts, which is highly effective in operation, economical in cost of manufacture, and capable of rapid adjustment when variations in brake shoe clearance are necessitated.

The above and other objects and novel features of the invention will appear more fully hereinafter from a consideration of the following detailed description when taken in connection with the accompanying drawing illustrating one form of the invention. It is to be expressly understood, however, that the drawing is employed for purposes of illustration only and is not to be taken as a definition of the limits of the invention, reference being had for this purpose to the appended claims.

In the drawings, wherein similar reference characters refer to similar parts throughout the several views;

Fig. 1 is a side view partly in section of a portion of a fluid pressure operated vehicle braking system embodying the novel slack adjuster and adjusting mechanism of the present invention, and Fig. 2 is a partial sectional view taken along line 2—2 of Fig. 1 and illustrating the novel locking device.

Referring to the drawing, the novel slack adjusting mechanism of the present invention is illustrated therein as including a body 10 provided with a brake lever 12 operatively connected with an actuator rod 14 of a brake actuator or chamber 16, the latter being adapted to be charged with fluid under pressure, such as compressed air or hydraulic fluid, through a conduit 18 having a brake valve or master cylinder 20 associated therewith. A worm wheel 22, operatively connected with a brake operating cam shaft 24, is rotatably mounted for rotation in the body 10 in a conventional manner, and is positioned to mesh with a worm 25 spaced axially from the axis of the worm wheel and in a plane at right angles thereto. As shown, the worm 25 is positioned between shoulders 26 and 28 of the body 10, and is secured to an adjusting shaft 30 by means of a set screw 32, the said shaft being suitably rotatably supported in the body and being provided with an end portion formed in such a manner as to provide a head 34 formed for engagement by a wrench for adjusting purposes. With such an arrangement, it will be readily understood that when it is desired to adjust the clearance of the brake shoes, it is only necessary to rotate the adjusting shaft 30 and worm 25 to cause rotation of the worm wheel 22 with respect to the body 10. In this manner, the brake operating cam shaft 24 will be rotated to establish the desired adjustment. The construction thus far described is well known in the art and hence, further description thereof is not believed to be necessary.

In slack adjusters of the foregoing type, several different arrangements have been heretofore provided for maintaining the parts in any position of adjustment, so that the particular adjustment will remain unchanged during operation of the brakes in service. For example, spring detents have been associated with the adjusting shafts in order to yieldingly maintain the shafts in the desired position of adjustment, and the ease with which adjustment of the slack adjuster may be effected against the yielding action of the detent, has caused devices of this character to become quite popular. However, it has been found that when higher braking loads are imposed on the mechanism, the adjustment tends to back off during brake application, and when the brakes are released, the adjustment does not return to its former position.

In order to overcome the above mentioned difficulty, the present invention provides a novel arrangement for insuring that the adjustment will not vary during application of the brakes. More particularly, and as shown, such arrangement includes a cylinder 36 having a piston 38 therein, the latter having a detent 40 operatively connected therewith and being yieldingly urged by a spring 42 to a position such that the detent 40 engages one of a plurality of circumferentially arranged notches 44 formed on the end portion of shaft 30. By this construction, the shaft 30 may be readily turned to any desired position of adjustment, against the yielding action of the detent 40, and when the desired position has been reached, the detent will engage one of the notches 44 and yieldingly maintain the parts in such position. For preventing any variation of the adjustment during application of the brakes, the cylinder 36 is arranged to be supplied with fluid pressure from the conduit 18 by means of conduit 46. Thus the piston 38 is always subjected to the same degree of pressure as is supplied the actuator 16 so that the locking force of the detent 40 is proportioned to the degree of brake application during charging of the actuator 16. Consequently as the braking pressures are increased, the locking detent action is increased and maintenance of the adjustment of the slack adjuster is assured throughout the range of braking pressures.

In operation, when it is desired to adjust the brake clearance, it is only necessary to rotate the shaft 30, by means of a suitable wrench applied to the head 34, in order to adjust the position of the worm wheel 22 and the brake operating cam shaft with respect to the body 10. As the shaft 30 is rotated, the spring-pressed detent 40 will be successively cammed out of engagement with the slots 44, due to the shape of the slots and the end of the detent, and will finally be resiliently urged into one of the slots when the adjusting action is completed. Thereafter, each time fluid pressure is conducted to the actuator 16 to apply the brakes through movement of the lever 12 and the brake operating shaft 24, fluid pressure will also be conducted through conduit 46 to the cylinder 36 to maintain the detent 40 in locking position with a force proportional to the braking pressure. Thus under high braking loads, the locking action will likewise be high, and maintenance of the adjustment of the slack adjuster will be assured.

While one embodiment of the invention has been illustrated and described herein, with considerable particularity, it will be understood by those skilled in the art that various changes and modifications may be resorted to without departing from the spirit of the invention. Reference will therefore be had to the appended claims for a definition of the limits of the invention.

What is claimed is:

1. In a slack adjuster for vehicle brakes comprising a body having a brake lever, a worm wheel supported for rotation in said body, a worm mounted in said body and engaging said worm wheel, and a fluid pressure operated brake actuator operatively connected with said brake lever for operating the latter when the actuator is energized by fluid pressure, a shaft for moving said worm to adjust the position of said worm and worm wheel with respect to the body, a yielding detent engaging said shaft to yieldingly maintain the latter in a desired position of adjustment, a fluid pressure operated device operatively connected with the detent, and means for simultaneously conducting fluid pressure to said actuator and said device to respectively operate the actuator and to prevent any change of adjustment of said shaft while the actuator is supplied with fluid pressure.

2. In a slack adjuster for vehicle brakes comprising a body having a brake lever, a worm wheel supported for rotation in said body, a worm mounted in said body and engaging said worm wheel, and a fluid pressure operated brake actuator operatively connected with said brake lever, a shaft for moving said worm to adjust the position of said worm and worm wheel with respect to the body, said shaft being formed with a series of circumferentially arranged notches adjacent one end thereof, a cylinder associated with said body, a piston movable in said cylinder, a detent operatively connected with the piston and arranged to engage one of said notches to latch said shaft in a desired position of adjustment, a spring in said cylinder for yieldingly urging said piston and detent to latching position, and means to charge said cylinder with fluid pressure upon fluid pressure energization of said brake actuator.

CLAUDE E. LEARN.

REFERENCES CITED

The following references are of record in the file of this patent:

UNITED STATES PATENTS

| Number | Name | Date |
| --- | --- | --- |
| 1,782,571 | Hukill | Nov. 25, 1930 |
| 2,156,154 | Hooker | Apr. 25, 1939 |
| 2,374,002 | Down et al. | Apr. 17, 1945 |
| 2,377,014 | Keller | May 29, 1945 |
| 2,427,310 | Shumaker | Sept. 9, 1947 |